United States Patent
Haines (10) Patent No.: US 7,421,466 B2
(45) Date of Patent: Sep. 2, 2008

(54) DYNAMIC MAPPING OF WIRELESS NETWORK DEVICES

(75) Inventor: Robert E. Haines, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 663 days.

(21) Appl. No.: 10/015,097

(22) Filed: Oct. 29, 2001

(65) Prior Publication Data

US 2003/0080992 A1  May 1, 2003

(51) Int. Cl.
*G06F 15/16* (2006.01)
*G06F 15/173* (2006.01)
*H04Q 7/20* (2006.01)
*G08G 1/123* (2006.01)

(52) U.S. Cl. .............. 709/200; 709/223; 709/226; 709/229; 709/242; 455/456.1; 455/446; 455/461; 340/990; 340/995.13

(58) Field of Classification Search .......... 709/223, 709/225, 226, 229, 239, 242, 200; 455/456.1, 455/456.3, 461, 256.1, 256.3, 446; 701/201, 701/208; 340/990, 995.13
See application file for complete search history.

(56) References Cited

U.S. PATENT DOCUMENTS

| | | |
|---|---|---|
| 4,644,532 A | 2/1987 | George et al. |
| 4,825,206 A | 4/1989 | Brice, Jr. et al. |
| 4,914,571 A | 4/1990 | Baratz et al. |
| 5,185,860 A | 2/1993 | Wu |
| 5,276,789 A | 1/1994 | Besaw et al. |
| 5,293,635 A | 3/1994 | Faulk, Jr. et al. |
| 5,297,138 A | 3/1994 | Black |
| 5,421,024 A | 5/1995 | Faulk, Jr. et al. |
| 5,450,408 A | 9/1995 | Phaal |
| 5,458,123 A | 10/1995 | Unger |
| 5,481,674 A | 1/1996 | Mahavadi |
| 5,548,583 A | 8/1996 | Bustamante |
| 5,548,722 A | 8/1996 | Jalalian et al. |
| 5,594,731 A | 1/1997 | Reissner |
| 5,611,050 A | 3/1997 | Theimer et al. |
| 5,659,596 A | 8/1997 | Dunn |
| 5,684,959 A | 11/1997 | Bhat et al. |
| 5,687,320 A | 11/1997 | Wiley et al. |
| 5,787,077 A * | 7/1998 | Kuehnel et al. ............. 370/331 |
| 5,790,536 A | 8/1998 | Mahany et al. |
| 5,793,975 A | 8/1998 | Zeldin |
| 5,812,865 A | 9/1998 | Theimer et al. |
| 5,862,404 A | 1/1999 | Onaga |
| 5,920,698 A | 7/1999 | Ben-Michael et al. |
| 5,942,984 A | 8/1999 | Toms et al. |
| 6,003,074 A | 12/1999 | Vasconcellos |
| 6,038,600 A | 3/2000 | Faulk, Jr. et al. |
| 6,061,505 A | 5/2000 | Pitchaikani et al. |

(Continued)

*Primary Examiner*—Ario Etienne
*Assistant Examiner*—El Hadji M Sall (57) ABSTRACT

Methods and apparatus for presenting dynamic mapping information in a wireless network are useful in locating or identifying a desired service-providing device within the wireless network relative to a service-requesting device. The mapping information may be physical network mapping or it may be physical network mapping combined with logical network mapping. The mapping may further include supplemental information regarding the network and its devices. The physical network mapping provides information regarding the location of a service-providing device relative to a service-requesting device. Dynamic mapping information accommodates transient users of the wireless network, facilitating location or identification of a desired service-providing device in an unfamiliar network or surrounding.

13 Claims, 9 Drawing Sheets

U.S. PATENT DOCUMENTS

| | | | |
|---|---|---|---|
| 6,067,093 A | 5/2000 | Grau et al. | |
| 6,084,867 A | 7/2000 | Meier | |
| 6,094,678 A * | 7/2000 | Nethercott et al. | 709/220 |
| 6,108,702 A | 8/2000 | Wood | |
| 6,138,245 A * | 10/2000 | Son et al. | 713/400 |
| 6,151,624 A | 11/2000 | Teare et al. | |
| 6,151,631 A | 11/2000 | Ansell et al. | |
| 6,199,099 B1 * | 3/2001 | Gershman et al. | 709/203 |
| 6,201,611 B1 | 3/2001 | Carter et al. | |
| 6,216,087 B1 | 4/2001 | Want et al. | |
| 6,526,281 B1 * | 2/2003 | Gorsuch et al. | 455/452.1 |
| 6,542,813 B1 * | 4/2003 | Kovacs | 701/208 |
| 6,738,815 B1 * | 5/2004 | Willis et al. | 709/225 |
| 6,741,853 B1 * | 5/2004 | Jiang et al. | 455/418 |
| 6,795,709 B2 * | 9/2004 | Agrawal et al. | 455/452.1 |
| 6,845,091 B2 * | 1/2005 | Ogier et al. | 370/338 |
| 6,867,733 B2 * | 3/2005 | Sandhu et al. | 342/357.07 |
| 6,912,398 B1 * | 6/2005 | Domnitz | 455/461 |

* cited by examiner

DYNAMIC MAPPING OF WIRELESS NETWORK DEVICES

TECHNICAL FIELD OF THE INVENTION

The present invention relates generally to providing information concerning location of network devices in a wireless network, and in particular to dynamic mapping techniques in a wireless network environment.

BACKGROUND OF THE INVENTION

As networks of computing devices and peripherals become more complex and dynamic, it becomes increasingly important for the network structure to be flexible and to be easily updated. To address this challenge, wireless networks have become increasingly popular. Because device additions to a wireless network do not require the addition or rerouting of physical cabling, they are generally more flexible and easily updated than are wired networks. Wireless networks further have the advantage of being able to accommodate mobile or other transient devices.

One dilemma a network user may face is determining the physical location of a computer peripheral or other network device. As an example, a wireless network user may want to print out a color document from their palmtop computer. The user may want to locate a nearby color printer. While the operating system may be able to provide a list of suitable imaging devices along with textual descriptions of their location, this may not be helpful to the user if they are unfamiliar with the building or complex where the network is located.

For the reasons stated above, and for other reasons stated below that will become apparent to those skilled in the art upon reading and understanding the present specification, there is a need in the art for alternative methods for providing information to a network user concerning the location of wireless network devices in a wireless network.

SUMMARY

Methods and apparatus for presenting dynamic mapping information to a user in a wireless network are described herein. The mapping information may be physical network mapping or it may be physical network mapping combined with logical network mapping. The physical network mapping can provide information regarding the location of a service-providing device relative to a service-requesting device. Dynamic mapping information accommodates mobile or other transient devices of the wireless network, and especially user devices, facilitating location or identification of a desired service-providing device in an unfamiliar network or surrounding.

For one embodiment, the invention provides a dynamic map of a wireless network. The map includes representations of a plurality of network devices depicting locations of the network devices relative to a reference point. The locations of the representations are adapted for updating without the need for manual intervention.

For another embodiment, the invention provides a method of locating a service-providing device of a wireless network from a service-requesting device of the wireless network. The method includes generating dynamic mapping information for a plurality of network devices of the wireless network. The plurality of network devices includes the service-providing device and the service-requesting device. The method further includes providing an indication of a distance and a direction to the service-providing device from the service-requesting device using the dynamic mapping information.

Further embodiments of the invention include apparatus and methods of varying scope.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

The various embodiments provide methods of providing information to a network user concerning the expected location of network devices within a wireless computing environment. Network management facilities, such as HP OpenView (available through Hewlett-Packard Co., Palo Alto, Calif., USA) and Tivoli NetView (available through Tivoli Systems Inc., Austin, Tex., USA), are capable of providing logical network mapping, i.e., a mapping of the logical connectivity of the network. While this information is certainly useful to network managers, such logical mapping provides little guidance to a network user who is trying to locate a network device, e.g., the printer they just sent a document to or the nearest printer having the proper capabilities to send a document to. Physical network mapping, i.e., a mapping of the physical location of network devices, may also be available to a user. These physical maps are often of the form of a floor plan of the facilities housing the network with the various network devices shown on the floor plan. However, such information is frequently outdated as it relies on network users or operators to manually revise the maps when network devices are added, removed, moved or upgraded, and updating such maps is rarely a high-priority task. In the various embodiments described herein, the location information is provided dynamically to the user of the network. Such methods make use of the availability of location information that is updated continuously, periodically or on demand to update the physical maps without the need for manual intervention.

Location information may be provided via a variety of methods. Methods and apparatus for determining an expected location of a network device based on a signal strength of the network device received at one or more wireless gateways or base stations of a wireless network are disclosed in U.S. Pat. No. 6,826,162, issued to Haines et al. on Nov. 30, 2004, which is commonly assigned and incorporated by reference herein. Other methods of providing expected location of a network device may include the use of a global positioning system (GPS) incorporated into each network device. The use of radio frequency (RF) tags and proximity sensors is yet another method of obtaining the expected location information on a continuous, periodic or on-demand basis. Suitable methods of obtaining expected location information thus include any method that is capable of dynamic updates and that does not rely solely on user or operator knowledge of the device locations. The following embodiments will be described with reference to the methods of obtaining location information described in U.S. Pat. No. 6,826,162 noted above. FIGS. 1-6B and accompanying description relate to these methods. However, it will be apparent to those skilled in the art that other methods of obtaining dynamic mapping information may be substituted herein.

Figure 1:
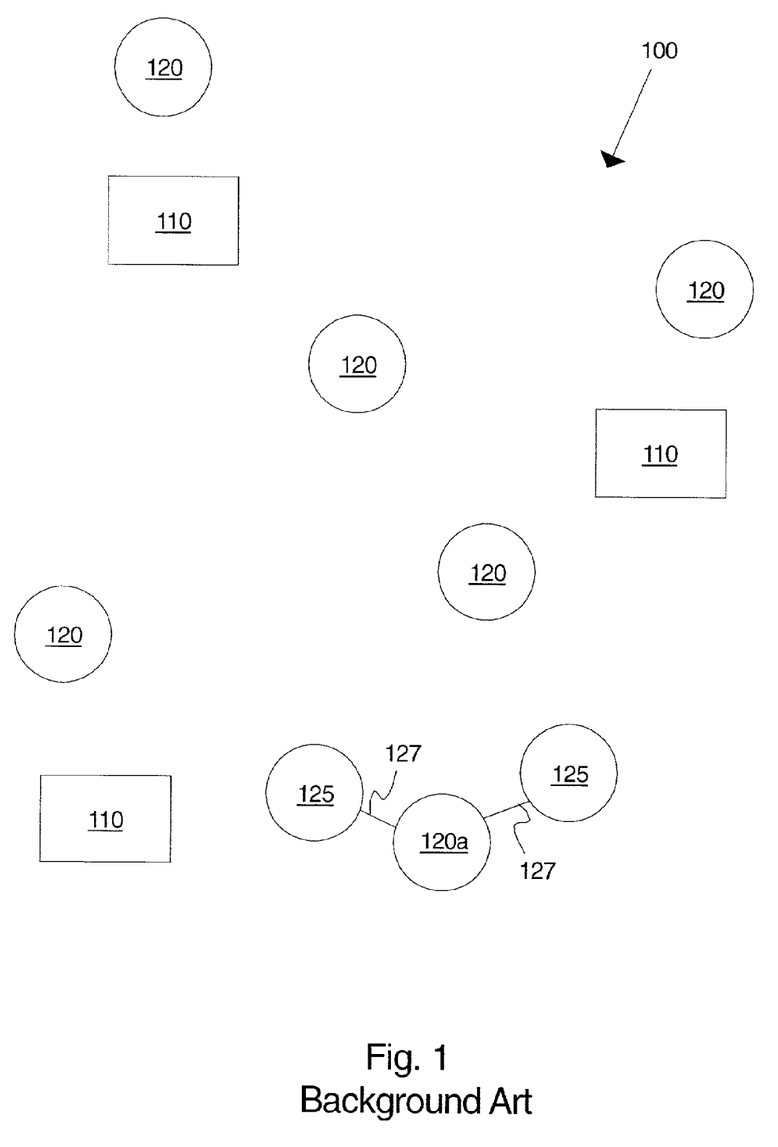
FIG. 1 is a schematic of a typical wireless network containing one or more wireless gateways and one or more other network devices.

FIG. 1 is a schematic of a typical wireless network 100 containing one or more wireless gateways 110 and one or more other network devices 120. The network devices 120 communicate with one or more of the gateways 110 using some form of wireless communication. Wireless communications include radio frequency (RF) communications, infrared (IR) communications, microwave communications and other techniques for communicating between devices without the need for a physical connection. Some examples of the network devices 120 include imaging devices (e.g., printers, facsimile machines, plotters and other devices for producing an image, whether single or multi-function devices), servers, workstations and storage devices (e.g., magnetic tape storage, magnetic disk storage, optical media storage and dynamic or non-volatile memory, whether permanent or removable).

One or more of the wireless network devices 120 may also communicate with wired network devices. As an example, a network device 120a may be a server, bridge, router or other wireless device on the wireless network 100 used to connect one or more wired network devices 125 to the wireless network 100 through physical wired connections 127. As an example, the network device 120a could be a computer workstation coupled to two imaging devices, such as a local laser printer and a local color printer. The wired connections 127 may be such physical connections as a parallel port connection to the workstation, a serial port connection to the workstation, a universal serial bus (USB) connection to the workstation and other cabled or direct-wired connections.

On a wired network, it is generally impossible to determine the relative distances between network devices based on information generated by the member network devices. While a time lag or propagation delay between sending and receiving a packet of information can give an indication of how far a signal traveled, the path may not be direct. As an example, two receiving devices could be pinged by a sending device. A propagation delay of one unit of time from the sending device to a first receiving device and three units of time from the sending device to a second receiving device may mean that the path between the sending device and the first receiving device is one-third the length of the path between the sending device and the second receiving device. However, the second receiving device may be located physically closer to the sending device, but merely have a more circuitous path from the sending device than does the first receiving device. Accordingly, the time lag cannot be used to determine relative distance between network devices. A network user may also use the number of router "hops" to determine whether network devices are contained in the same subnetwork, i.e., crossing a router indicates that a device is on a different subnetwork. However, as with propagation delay, a receiving device several subnetworks away may be physically adjacent to the sending device.

Contrarily, in a wireless network 100, data travels from a network device 120 substantially in a straight line to a wireless gateway 110, and vice versa. It is known that signal strength of a wireless transmission is generally inversely proportional to the square of the distance. That is, a received signal strength at distance x from a sending device is approximately $1/x^2$ the strength of the originating signal. Thus, if one knows the strength of the transmitted signal, the distance traveled may be calculated from the received signal strength. While signal strength may be detected and gathered in a variety of manners, wireless network client managers often provide this information as a utility or troubleshooting feature. An example of a client manager providing this information is the ORiNOCO™ Client Manager available from Lucent Technologies, Murray Hill, N.J., USA.

Figure 2:
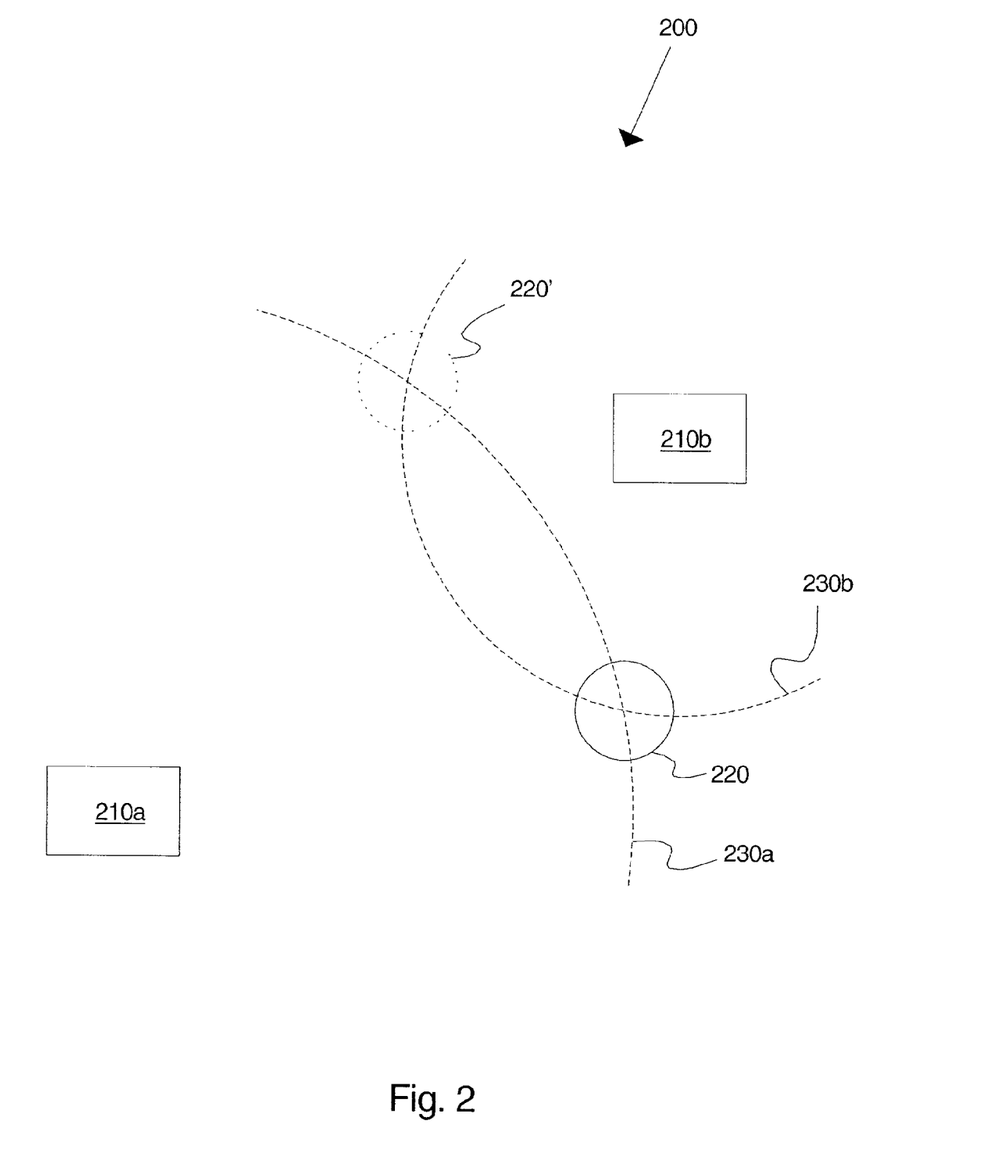
FIG. 2 is a schematic of a wireless network showing curves of estimated distance.

FIG. 2 is a schematic of a wireless network 200 containing one or more wireless gateways 210 and one or more other network devices 220. The network device 220 transmits wireless communications that are received by the wireless gateways 210a and 210b. Each wireless gateway 210 detects a signal strength associated with the wireless transmission received from the network device 220. Based on the detected signal strength, an estimated distance is determined between the transmitting device, e.g., network device 220, and the receiving device, e.g., a wireless gateway 210. While the discussion will focus on a network device 220 as a transmitting device and wireless gateways 210 as the receiving devices, each device type can act as either a transmitting device or a receiving device. Thus, while it is preferred to gather distance information using the wireless gateways 210 as the receiving devices, it is similarly possible to gather the distance information using the other network devices 220 as the receiving devices as the estimated distance is determined from a signal strength received between a transmitting device and a receiving device regardless of what type of device is acting as the receiving device.

The estimated distance can be represented mathematically as some form of closed curve such that the transmitting device is expected to be at some point on the curve surrounding the receiving device. For an omni-directional receiver, the closed curve would be circular in a two-dimensional system and spherical in a three-dimensional system. For purposes herein, a two-dimensional system implies that the receiving devices and the transmitting device all reside in substantially the same plane, such as a floor of an office building. Similarly, a three-dimensional system implies that the receiving devices and the transmitting device reside in different planes, such as multiple floors of the office building.

An example of a two-dimensional system using omni-directional receivers is shown in FIG. 2 with the arcs 230a and 230b representing portions of the closed curves associated with the wireless gateways 210a and 210b, respectively. For directional receivers, the shapes of the closed curves can be determined from the characteristics of the receivers. For example, a cardioid receiver may result in a curve of the estimated distance that is generally heart-shaped. The various embodiments will be described using the assumption of an omni-directional receiver, but the extension to more complex curves involves merely the substitution of the appropriate equation for the estimated distance. However, an additional advantage to using omni-directional receivers is that the curves of estimated distance may be drawn around either the receiving device or the transmitting device. That is, the arcs 230a and 230b could be generated from signal strength information for transmissions between the network device 220 and the wireless gateways 210a and 210b, whether the transmissions are received by the network device 220 from the wireless gateways 210a and 210b or received by the wireless gateways 210a and 210b from the network device 220.

The network device 220 is expected to be located at an intersection of the arcs 230a and 230b. However, in a two-dimensional system, the arcs 230a and 230b may intersect at two positions such that the transmitting device, in this case network device 220, is expected to be either at its true location or at a phantom location 220'. Where there is more than one solution to the intersection of the curves of estimated distance, the estimated location of the transmitting device could be given either as a single point, such as a point equidistant between the two solutions, or as multiple points, such as the set of points defining a line extending between the two solutions.

The situation for curves that are superimposed, i.e., curves that intersect at each of their points, is ignored. As a practical matter, such situations would only occur where the respective receiving devices are co-located. Furthermore, it should be apparent that in a three-dimensional system, two closed curves, e.g., two spheres, may intersect at more than two points. For example, the intersection of two spheres may be a circle. For this three-dimensional characterization, one additional receiving device is necessary to reduce the possible expected locations to two points.

Figure 3:
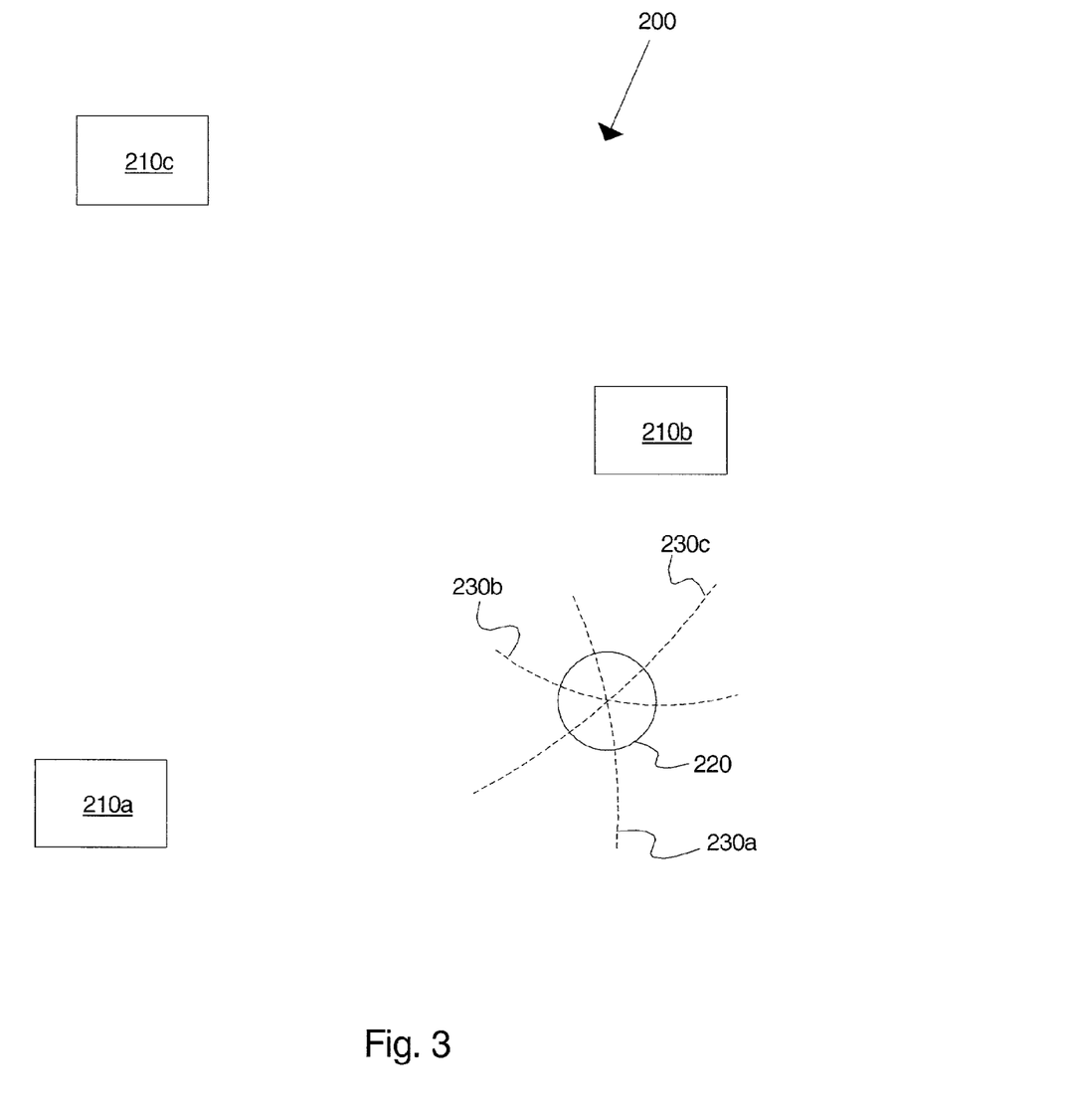
FIG. 3 is a schematic of the wireless network showing curves of estimated distance.

FIG. 3 is a schematic of the wireless network 200 having a wireless gateway 210c as an additional receiving device. Based on the received signal strength from the network device 220, a third arc 230c may be generated as an expected distance between the network device 220 and the wireless gateway 210c. For the two-dimensional characterization, having three receiving devices facilitates elimination of the phantom location and identification of the expected actual location of the network device 220. As noted above, for a three-dimensional characterization, one additional receiving device is necessary to reduce the possible expected locations to one point.

It is noted that a signal from a transmitting device may be received by more receiving devices than are necessary to uniquely determine an expected location of the transmitting device. For example, in a two-dimensional system, a signal from a network device 220 may be received by four or more wireless gateways. In such situations, it is preferable to choose the three strongest signals as these would be presumed to produce the lowest level of error in any resulting calculation. However, there is no prohibition to using more receiving devices than are necessary to produce a solution, nor is there a prohibition to using receiving devices other than the devices receiving the strongest signal levels.

Figure 4:
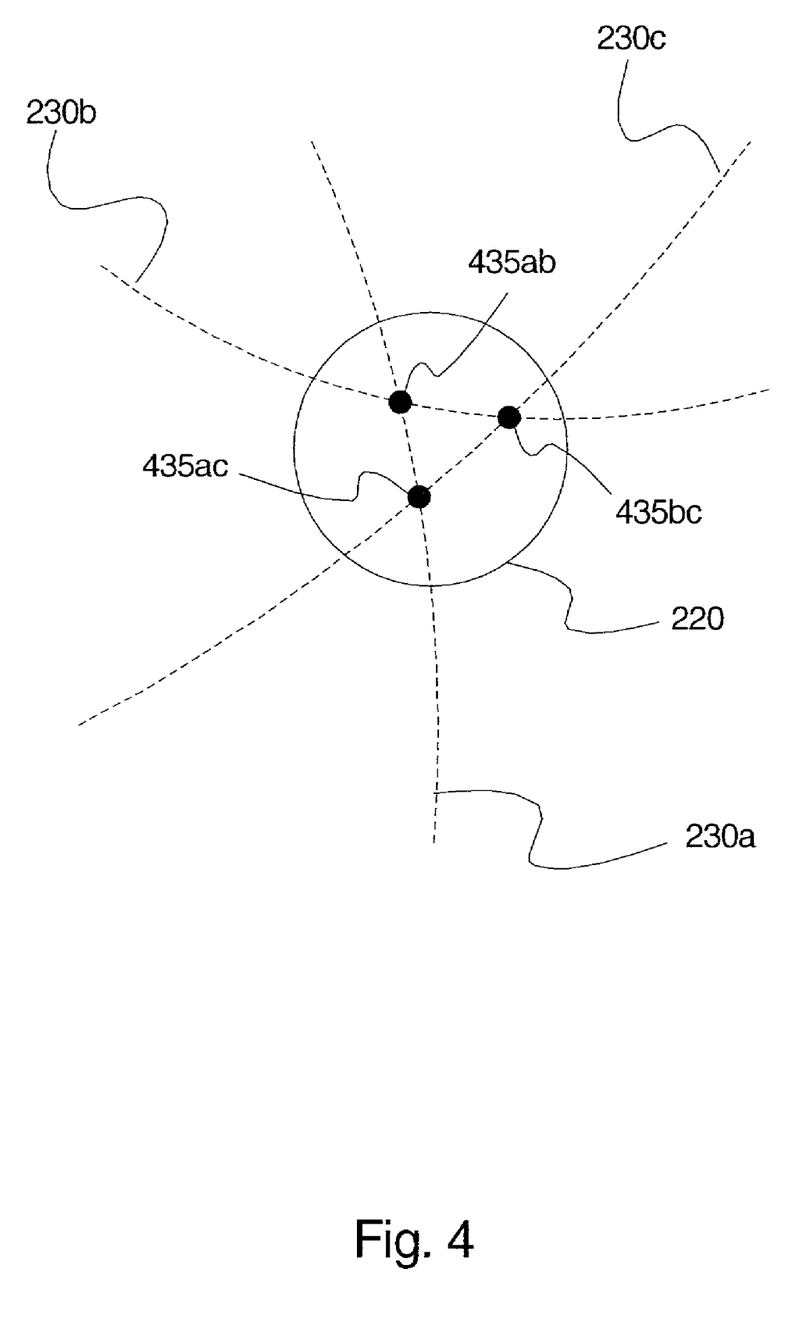
FIG. 4 depicts the intersection of portions of the curves of estimated distance of a network device from a trio of wireless gateways.

The foregoing description demonstrates the theoretical basis for the determination of a location of a transmitting device in a wireless network. However, it is recognized that the arcs 230a, 230b and 230c may not intersect at a common point, e.g., the actual location of the network device 220. FIG. 4 depicts the intersection of portions of the curves of estimated distance of the network device 220 from a trio of wireless gateways. As shown in FIG. 4, arcs 230a and 230b may intersect at 435ab, arcs 230a and 230c may intersect at point 435ac and arcs 230b and 230c may intersect at point 435bc. These three closest points of intersection (there are three additional points of intersection outside the extent of the figure) may still be used to generate the expected location of the network device 220. The location of the network device 220 may be estimated as an average of the closest points of intersection, e.g., a point equidistant from each of the points of intersection. For another embodiment, the location of the network device 220 may be estimated to be a weighted average of the closest points of intersection, e.g., the points of intersection could be weighted based on the received signal strength, with more weight being given to the points of intersection having the highest received signal strength. Stronger signal strengths can be presumed to generate more accurate estimations of expected distance, so the actual location can be expected to be closer to the point of intersection of the two curves having the smallest radii, area or volume. Further refinement, describe later, may be desired if the area defined by the closest points of intersection is above some threshold level.

Figure 5:
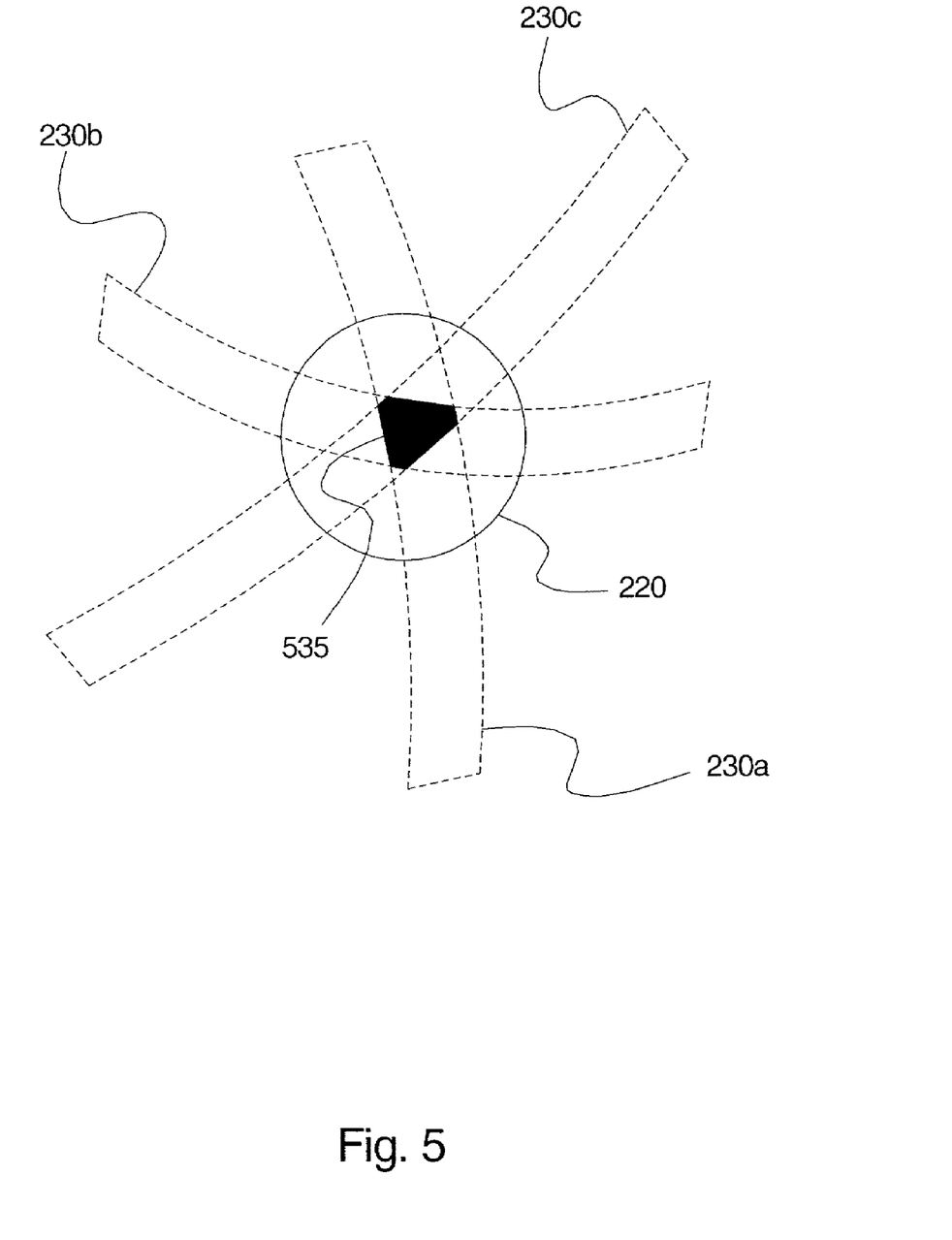
FIG. 5 depicts the intersection of portions of the curves of estimated distance of a network device from a trio of wireless gateways using ranges of estimated distance.

FIG. 5 depicts the intersection of portions of the curves of estimated distance of the network device 220 from a trio of wireless gateways using ranges of estimated distance. To reduce the likelihood that curves will not have a common point of intersection, the curves of estimated distance may be given as ranges of distance such that the expected location of the network device 220 is between some minimum distance and some maximum distance for each receiving device. The maximum and minimum distances may be based on a calculated distance plus or minus an expected error of the calculation. The expected location of the network device 220 in this scenario is the intersection 535 of the three bands of the arcs 230a, 230b and 230c. The expected location can be given as a single point, such as a center point of the intersection 535, or as multiple points, such as the set of points making up the intersection 535.

Figure 6A:
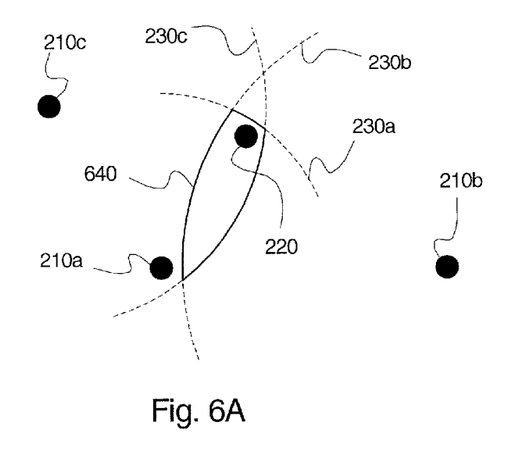
FIGS. 6A-6B depict the intersection of portions of the curves of estimated distance of a network device from a trio of wireless gateways.
Figure 6B:
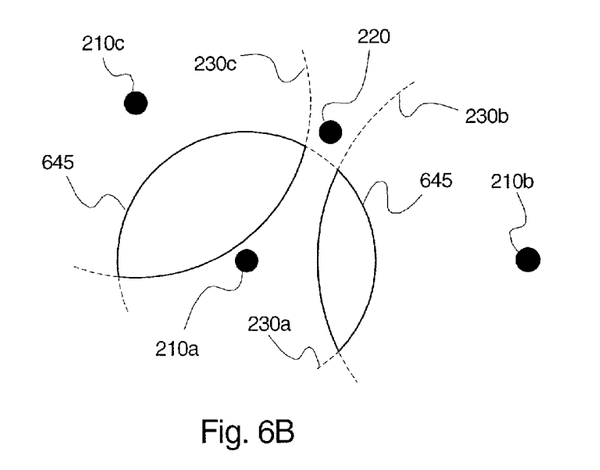

FIGS. 6A and 6B are used to describe additional methods of accommodating instances where the intersection of the curves of expected distance do not uniquely define a point of expected location of the network device 220. In FIG. 6A, the estimated distance curves 230a, 230b and 230c are generated in response to the signal strength received at the wireless gateways 210a, 210b and 210c, respectively, from the network device 220. Each of the arcs 230a, 230b and 230c overestimates the distance between its respective receiving device and the transmitting device. This can be caused by having a transmitted signal strength from the network device 220 that is lower than expected. Instead of generating the expected location of the network device 220 from the closest points of intersection, as described with reference to FIG. 4, the expected location of the network device 220 can be based alternatively on the common area of overlap 640. This area of overlap 640 is that portion of space contained within each of the curves of estimated distance. A threshold level can be defined, based on a desired level of accuracy, to determine whether further refinement is necessary. For example, it may be desirable to define an expected location of a network device 220 to be an area of no more than 100 square feet. For this example, if the common area of overlap 640 is less than or equal to 100 square feet, no further refinement is necessary.

If it is desired to further refine the estimate of expected location of the network device 220, e.g., the size of the area of overlap 640 is above some predefined threshold, ranges of distance can be used as described with reference to FIG. 5 in an attempt to produce a common point of intersection. Alternatively, or in addition, a gain factor can be employed to adjust each of the curves of estimated distance. In the instance where there is a common area of overlap 640, but no common point of intersection, the received signals at each of the receiving devices could be multiplied by some gain factor greater than one to generate revised curves having lower estimated distances, thereby reducing the size of the common area of overlap 640. Alternatively, the estimated distances could each be multiplied by some positive gain factor less than one to generate the revised curves. This process can be repeated until the common area of overlap 640 has a size that is below the threshold.

In FIG. 6B, the estimated distance curves 230a, 230b and 230c are generated in response to the signal strength received at the wireless gateways 210a, 210b and 210c, respectively, from the network device 220. Each of the arcs 230a, 230b and 230c underestimates the distance between its respective receiving device and the transmitting device. This can be caused by having a transmitted signal strength from the network device 220 that is higher than expected. In a situation as shown and described with reference to FIG. 4, the three closest points of intersection can be used to generate the expected location of the network device 220. However, as shown in FIG. 6B, two of the arcs 230 may not intersect at any point. While there are areas of overlap 645 between arc 230a and 230b and between arc 230a and 230c, there is no area of overlap between arc 230b and 230c, nor is there any area of overlap common to all of the curves. It is possible to generate the expected location of the network device 220 from the two closest points of intersection, such as a midpoint of a line drawn through the closest points of intersection. Alternatively, the received signals at each of the receiving devices could be multiplied by some positive gain factor less than one to generate revised curves having higher estimated distances or the estimated distances could each be multiplied by some gain factor greater than one to generate the revised curves. This process can be repeated until there is a common point of intersection or the closest points of intersection for each of the curves generate an area falling below the threshold level.

It is also conceivable that the transmitting device will be so close to the receiving device that the received signal will be saturated. In such circumstances, the received signal can be attenuated for the purposes of detecting distance. Of course the estimated distance must be correspondingly adjusted downward, such as by the square root of the attenuation. For example, if the received signal is attenuated using a gain factor of 0.8 and an omni-directional receiver, the distance estimated from this attenuated signal might be multiplied by the square root of 0.8 for use in estimating the expected location of the transmitting device.

The methods of generating location information are suited to be performed by computer processors in response to instructions in either software, firmware or hardware. These computer-readable instructions are stored on a computer-usable medium and are adapted to cause the processor to perform the methods. In a hardware solution, the instructions are hard coded as part of a processor, e.g., an application-specific integrated circuit (ASIC) chip, to perform the methods of one or more of the embodiments. In a software or firmware solution, the instructions are stored for retrieval by the processor. Some additional examples of computer-usable media include static or dynamic random access memory (SRAM or DRAM), read-only memory (ROM), electrically-erasable programmable ROM (EEPROM), magnetic media and optical media, whether permanent or removable.

The methods may be performed on a continuous basis, or more preferably, on a periodic, user-initiated or event-driven basis. As one example, the methods may be performed daily or hourly to generate expected locations of the devices within the network. As another example, the methods may be performed in response to a user query for location information. As a further example, the methods may be performed in response to events such as new devices being added to the network, existing devices being removed from the network, a start-up of a network device, etc.

The location information may be collected and processed in a central location for use by any network device. For example, a network server or workstation hosting a network client manager may be responsible for generating and storing location information to be accessed by client devices within the network. Alternatively, the location information may be collected and processed at a device initiating the collection procedure. For example, a mobile user may query devices within its transmission range to collect signal strength information. The mobile user's device, such as a handheld computer, can then generate the expected locations for the network devices relative to the mobile user.

Each wireless network device in communication with a wireless gateway, including other wireless gateways, may be located relative to one another by repeating the process of locating network devices. Building a database, a table or some other data structure based on this relative location data permits identification of a nearest device relative to any reference point, such as a mapping coordinate or some network device. This data structure can further contain supplemental information such as device type, device capabilities, device status, etc. As an example of use for such a data structure, a network user may be looking for the nearest color printer that is on-line and contains photo-quality print media. The user can perform a query, a look-up function or some other search on the data structure to identify the devices meeting these criteria. The criteria may be compared only to the supplemental information, identifying or excluding devices having certain features, options, characteristics, status, performance, consumables, etc. Alternatively, the criteria may further be compared to the location information. As such, the criteria may be designed to exclude network devices that are in certain areas of the network, e.g., areas where a user lacks authorization, or within certain ranges from the reference point. Upon identifying those devices matching the criteria, the location information may be used to identify that device matching the criteria that is nearest the reference point.

Knowledge of an absolute location of one of the devices will further permit mapping of the wireless network such as by Cartesian coordinates, latitude/longitude or other coordinate system. As one example, the absolute location of one or more devices could be entered into the data structure and the remaining locations calculated based on its position relative to one of the absolute locations as determined using methods such as those described with reference to FIGS. 1-6B. Alternatively, the absolute locations could be determined directly for each network device such as by using GPS systems.

Figure 7:
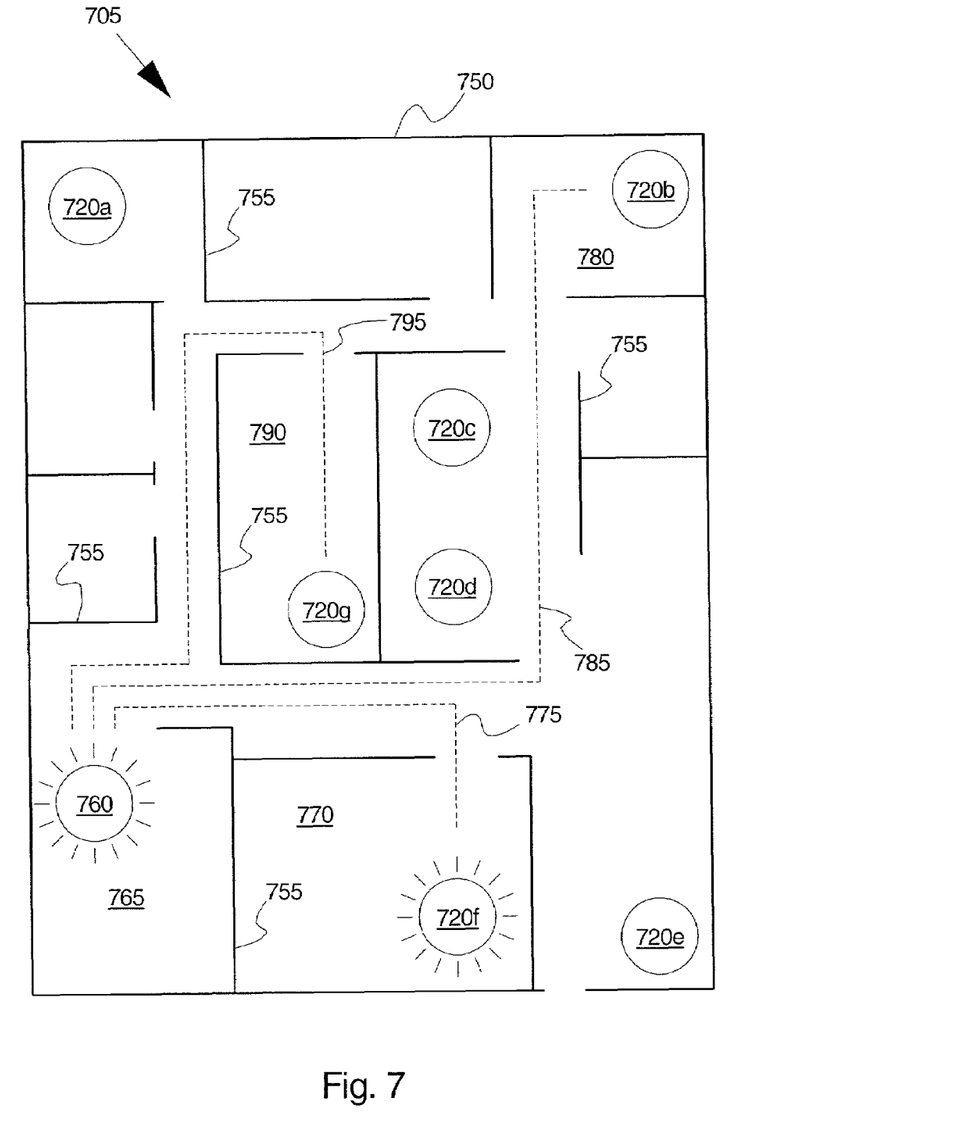
FIG. 7 is an example of a map of a network relative to the facilities housing the network in accordance with an embodiment of the invention.

These absolute locations could be superimposed on a map of the facilities housing the network, such as an office map or floor plan, to show the location of the devices in relation to the facilities. The map of the facilities can include supplemental information such as locations of outlets, network connections, telephones, controlled entrances, etc. FIG. 7 is an example of a map 705 of a network relative to the facilities housing the network in accordance with an embodiment of the invention. In particular, FIG. 7 is a map 705 showing a plurality of network devices 720 and 760 superimposed on a floor plan 750. Devices 720 and 760 may be any network devices, e.g., imaging devices, workstations, servers, gateways, etc.

The location of the network devices 720 and 760 on map 705 are determined dynamically on a continuous basis, on a periodic basis, or in response to queries or events. Local wired devices may be presumed to be co-located with their associated wireless network devices for purposes of generating the map 705. The dynamic map 705 may be stored in a central repository, such as any of the network devices 720 and 760, for access by one or more of the network devices 720 and 760. Alternatively, the map 705 may be stored on the network device 760 for use only by that network device.

With reference to the dynamic map 705, network device 760 may seek services from other network devices 720. For example, a user on network device 760 may wish to print a color document. From the available network devices 720, it is determined which of the network devices 720 are capable of providing the desired service. For the example to be described with reference to FIG. 7, network devices 720b, 720f and 720g are capable of providing the desired service to the network device 760.

The network device 760 seeking or requesting services, i.e., a requesting device, may be highlighted or otherwise identified on the map to ease location of other network devices relative to the requesting device. Highlighting can include use of color, shading, texture, shape, tone, flashing, text labels or any other method of distinguishing the requesting device. Similarly, matching network devices 720, i.e., those network devices 720 able to provide the desired service, may also be highlighted to distinguish matching devices from those incapable of providing the desired service. As one example, the requesting device 760 seeking services may appear on the map 705 in blue, the matching devices 720b, 720f and 720g may appear on the map 705 in green and the remaining network devices 720a, 720c, 720d and 720e may appear on the map 705 in gray.

The matching devices may further be prioritized, such as by distance relative to the requesting device. The distances between the requesting device and the various matching devices may be determined on a straight-line basis as described with reference to FIGS. 1-6B. More preferably, however, the distances between the requesting device 760 and the various matching devices 720b, 720f and 720g should take into account obstructions, such as walls 755 of the floor plan 750, in determining distance. For example, while the matching device 720g in location 790 is physically closer to the requesting device 760 than is the matching device 720f in location 770, the path 775 between requesting device 760 and matching device 720f is shorter than the path 795 between requesting device 760 and matching device 720g. The matching device 720f would thus have a higher priority than matching device 720g if obstructions between the requesting device and the matching devices are taken into account. In addition to physical obstructions, such as walls 755, the various methods may also take into account logical obstructions. For example, the location 780 or matching device 720b may be restricted such that a user of the requesting device 760 does not have authorization to enter the location or use the device, or it is desired that the user only access the matching device 720b on a limited basis. While a path 785 is available to the user of the requesting device 760 to reach the matching device 720b, its restricted status may be used to push it to a low priority level or to remove it from consideration.

Figure 8:
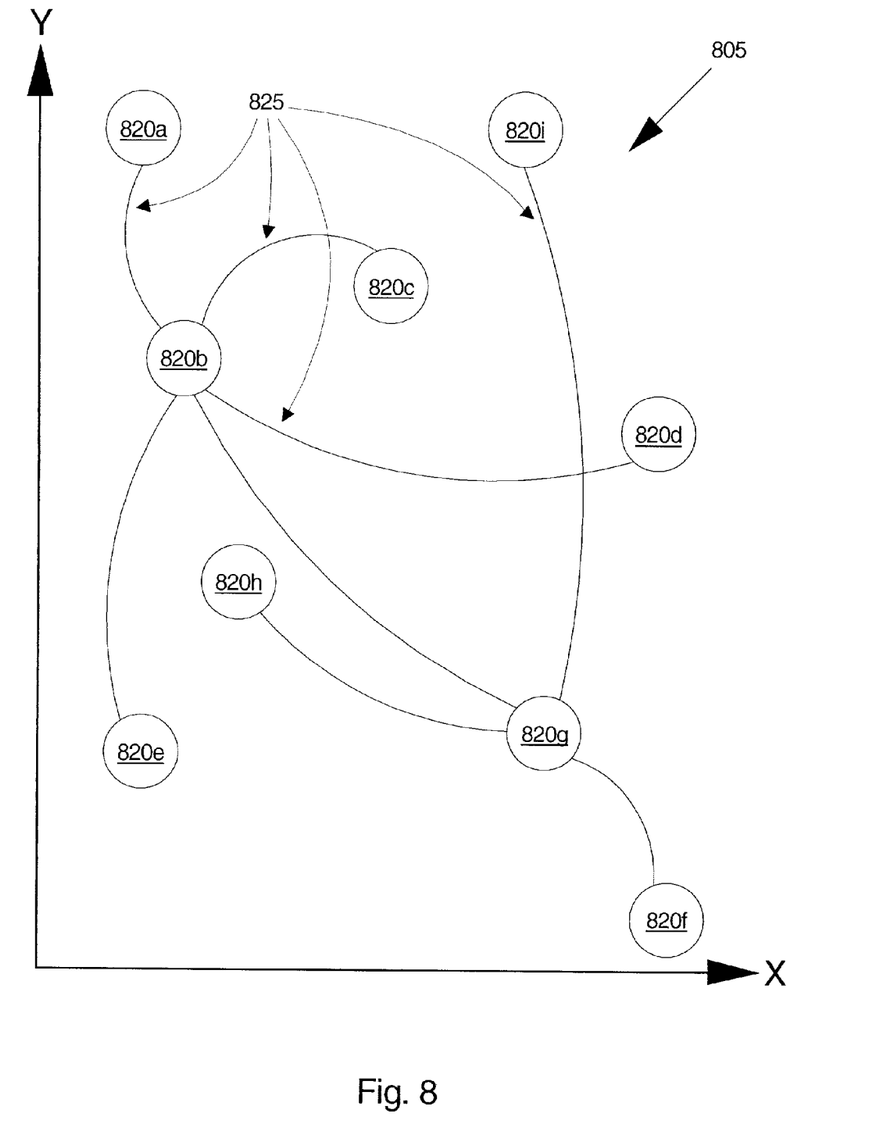
FIG. 8 is an example of a map of a network showing both physical mapping and logical mapping in accordance with an embodiment of the invention.

As discussed earlier, network management facilities, such as HP OpenView (available through Hewlett-Packard Co., Palo Alto, Calif., USA) and Tivoli NetView (available through Tivoli Systems Inc., Austin, Tex., USA), are capable of providing logical network mapping, i.e., a mapping of the logical connectivity of the network. Such network management facilities could be modified to simultaneously provide physical mapping along with the logical mapping. FIG. 8 is an example of a map 805 of a network showing both physical mapping and logical mapping in accordance with an embodiment of the invention. The map 805 depicts a plurality network devices 820 showing their physical relationship in a Cartesian coordinate system. Alternatively, the network devices 820 could be shown in some other coordinate system and could also be shown relative to a floor plan or other mapping overlay. The map 805 further shows logical communication paths 825 between the network devices 820. For example, map 805 shows that communication between network device 820a and 820i occurs through network devices 820b and 820g. It can also be seen from map 805 that devices that are physically closer may be logically more removed. For example, network device 820i is closer to network device 820a than is network device 820e. However, network device 820i is logically more removed from network device 820a than is network device 820e as additional hops, i.e., intermediary network devices, are required for communication to take place.

In the various embodiments, the service requested by a network device or its associated user may automatically be provided by the matching device having the highest priority. For example, upon requesting a service and identifying network devices capable of providing the desired service, the set of matching devices may be compared to a predetermined criteria to determine the device most closely matching the criteria. The job can then be sent from the requesting device to this preferred device without further involvement of a user of the requesting device. For another embodiment, the user may view the set of matching devices and select one as the service provider. Selection of the service provider may be from a list of matching devices. Alternatively, selection of the service provider may be directly from the dynamic map, e.g., pointing to and "clicking" on a representation of the matching device. Each representation may further include display of associated supplemental information, which may, for example, be displayed continuously or only when selected or highlighted.

For various embodiments, the highest-priority or otherwise selected matching device may be highlighted differently than other matching devices. For example, in FIG. 7, a preferred service-providing network device 720f is depicted to be highlighted to differentiate it from remaining network devices, either other matching devices or devices incapable of providing the desired service. In addition to highlighting matching devices, the paths between the requesting device and the matching devices may be represented on the map. This may include only the path to the selected device, or it may include the paths to each of the matching devices available to a user of the requesting device.

Figure 9:
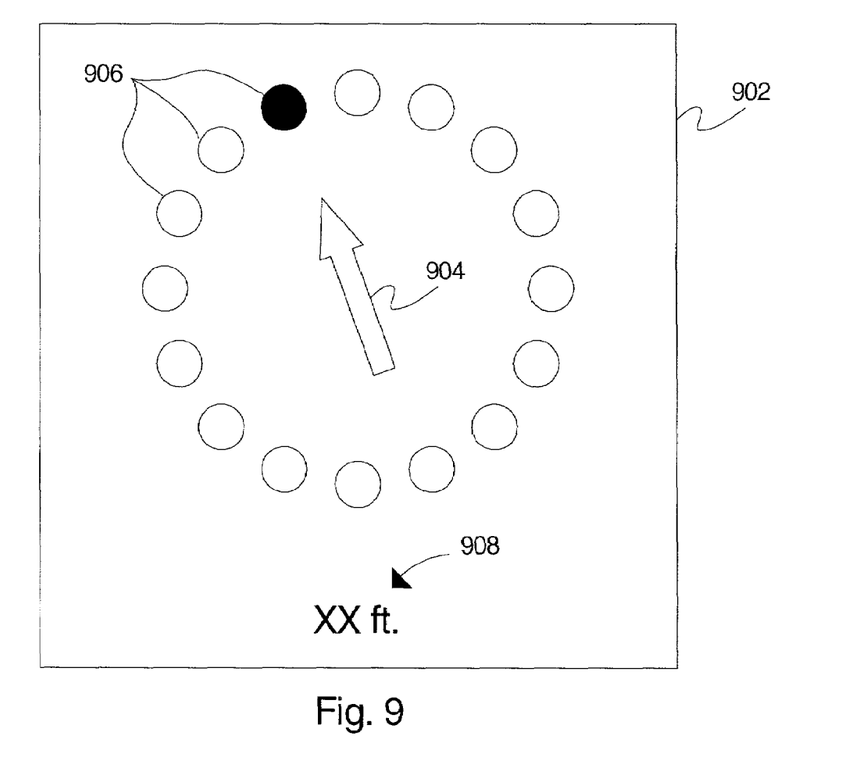
FIG. 9 is a schematic of an example indicator for use with embodiments of the invention.

In addition to depicting a path to a selected network device, or in the alternative, an indicator may be provided to the user of the requesting device 760 to assist the user in finding the network device. An example of an indicator is shown in FIG. 9. The indicator may be provided to the user on a display 902 of the requesting device, such as a liquid crystal display (LCD) screen of a handheld computing device or a monitor of a workstation. Information for generating the indicator is derived from the dynamic map of the network, whether or not it is displayed to a user of the network.

The indicator may have one or more elements providing an indication to the user of a direction and/or a distance to the desired network device. For example, the display 902 of FIG. 9 depicts directional indication using arrow 904, e.g., pointing in the desired direction, and a compass of markers 906, e.g., highlighting one marker 906 indicative of the desired direction. One or both of these directional indicators could be used for the display 902. The directional indicator may further use textual or other indicators to provide directional information to the user of the requesting device.

Alternatively, one directional indicator could be used to indicate a fixed direction, e.g., magnetic North or a facility landmark such as a building entrance, and another directional indicator could be used to indicate the direction to the service-providing network device relative to the first directional indicator. In this example, lining up the first directional indicator with the fixed direction would provide the user with the direction to the service-providing network device. Absence use of a fixed directional indicator, the requesting device should be capable of determining orientation within the network, such as by incorporating an internal magnetic compass or other directional finder. Such embodiments are especially suited for use in handheld computing devices, personal digital assistants (PDAs) or other mobile network devices.

The display 902 may further include a distance indicator such as a text field 908 providing a distance to the service-providing device relative to the requesting device. Alternatively, or in addition, the directional indicators may also provide an indication of distance. For example, the size of the arrow 904 could be indicative of distance, e.g., a shrinking arrow 904 can be used to indicate that the user is getting closer to the desired device. Although the display 902 is depicted as containing visual indicators, audible or tactile indicators could also be utilized with the embodiments of the invention.

For the various embodiments, any distance or directional indicators can be based on a straight-line distance/direction to the service-providing device. More preferably, however, any distance or directional indicators should be based on an actual distance/direction to the service-providing device using a path that accounts for obstructions. For such embodiments that account for obstructions, the direction to the service-providing device may change while approaching the device even as the distance to the device continues to diminish.

In addition to graphical maps as described with reference to FIGS. 7 and 8, the dynamic mapping information may take the form of an ordered list providing an indication of relative distance and/or priority. For example, a user initiating a print command may be presented with a list of imaging devices capable of providing the desired print service. This list could be ordered to present the imaging device closest to the user and/or having the highest priority at the top of the list. Subsequent devices could further be ordered in terms of increasing distance and/or decreasing priority.

Although not shown, an indicator may also be utilized in conjunction with the selected network device or the facilities housing the network to aid a user in finding or locating the selected network device. For example, a light may be associated with each network device and adapted to light or flash when its associated network device is selected by a user. Similarly, lighted pathways, directional beacons, tones or other visual, audible or tactile indicators could be utilized to guide a user to their selected device.

Figure 10:
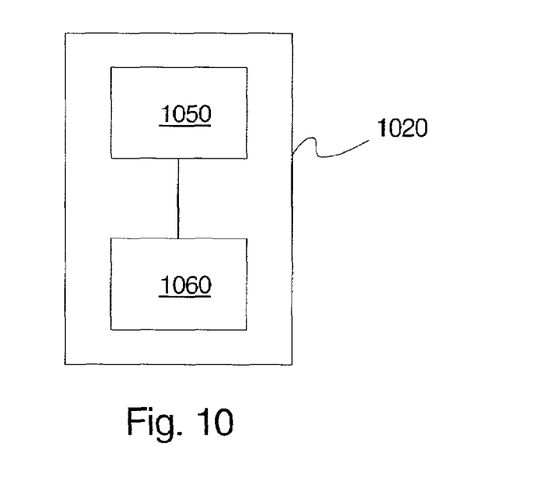
FIG. 10 is a schematic of a network device adapted to perform at least a portion of the methods in accordance with the invention.

Methods of the various embodiments of the invention may be performed by a variety of types of network devices, i.e., they may be performed by the requesting device, a service-providing device in communication with the requesting device and/or another device in communication with the requesting device. Methods of the various embodiments of the invention may further be distributed among more than one of the network devices. For example, a first network device may be used to generate mapping information, a second network device may be used to prioritize the devices capable of providing a requested service and a third network device may be used to direct a user to a selected one of the matching devices. FIG. 10 is a schematic of a network device adapted to perform at least a portion of the methods in accordance with the invention.

The network device 1020 includes a processor 1050 and a computer-usable medium 1060. The computer-usable medium 1060 includes instructions adapted to cause the processor 1050 to perform at least a portion of a method in accordance with an embodiment of the invention. The processor 1050 may further be adapted to store the mapping information on the computer-usable medium 1060 as a central repository or for use locally by the network device 1020. It is noted that the computer-usable medium 1060 may contain more than one type of media. For example, the computer-readable instructions may be stored on a nonvolatile EEPROM memory device while the mapping information is stored on a volatile DRAM memory device. Alternatively, one type of media may serve both storage functions. For example, the computer-readable instructions and the signal information may both be stored on a non-removable magnetic disk storage drive.

CONCLUSION

Methods and apparatus for presenting dynamic mapping information to a user in a wireless network are described herein. The mapping information may be physical network mapping or it may be physical network mapping combined with logical network mapping. The physical network mapping provides information regarding the location of a service-providing device relative to a service-requesting device. Dynamic mapping information accommodates mobile or other transient devices of the wireless network, and especially user devices, facilitating location or identification of a desired service-providing device in an unfamiliar network or surrounding.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any such adaptations or variations of the invention. It is manifestly intended that this invention be limited only by the following claims and equivalents thereof.

What is claimed is:

1. A dynamic map of a wireless network, comprising:
representations of a plurality of network devices depicting locations of the network devices relative to a reference point, wherein the locations of the representations are adapted for updating in response to changes in mapping information contained on a computer-usable medium of one of the network devices without the need for manual intervention;
a representation of a first network device of the plurality of network devices that is requesting a service on the wireless network; and a representation of a second network device of the plurality of network devices that is capable of providing the requested service;

wherein the representation of the first network device is highlighted to differentiate it from representations of other network devices;

wherein the representation of the second network device is highlighted to differentiate it from representations of other network devices that are incapable of providing the requested service;

wherein the representations comprise visual, audible and/or tactile indicators; and wherein the representations provide an indication of at least a relative distance between their respective network device and the reference point.

2. The dynamic map of claim 1, wherein at least one of the network devices or the reference point is a transient device of the wireless network.

3. The dynamic map of claim 1, further comprising representations of logical connectivity of the plurality of network devices.

4. The dynamic map of claim 1, wherein the representations of the plurality of network devices comprise an ordered list of a set of the network devices capable of providing the service requested by the first network device of the wireless network, and wherein the order of the list is indicative of a proximity of each of the plurality of network devices to the first network device requesting the service.

5. The dynamic map of claim 1, further comprising:
a representation of at least one third network device of the plurality of network devices that is capable of providing the requested service;
wherein the representation of the at least one third network device is highlighted to differentiate it from representations of other network devices that are incapable of providing the requested service.

6. The dynamic map of claim 5, wherein the second network device is a device most closely matching a selection criteria to provide the requested service and wherein the highlighting of the representation of the second network device further differentiates it from a representation of each third network device.

7. The dynamic map of claim 1, further comprising:
a representation of a path between the first network device and the second network device.

8. The dynamic map of claim 7, wherein the representation of the path between the first network device and the second network device accounts for obstructions between the first network device and the second network device.

9. The dynamic map of claim 7, further comprising:
a representation of a path between the first network device and each of the third network devices.

10. The dynamic map of claim 9, wherein the representation of the path between the first network device and each of the third second network devices accounts for obstructions between the first network device and the third network devices.

11. The dynamic map of claim 1, further comprising a directional indicator indicative of a direction between a first network device requesting a service on the wireless network and a second network device selected to provide the requested service.

12. The dynamic map of claim 1, further comprising a distance indicator indicative of a distance between the first network device requesting a service on the wireless network and the second network device.

13. The dynamic map of claim 12, wherein the distance indicator accounts for obstructions in a path between the first network device and the second network device.

* * * * *